UNITED STATES PATENT OFFICE.

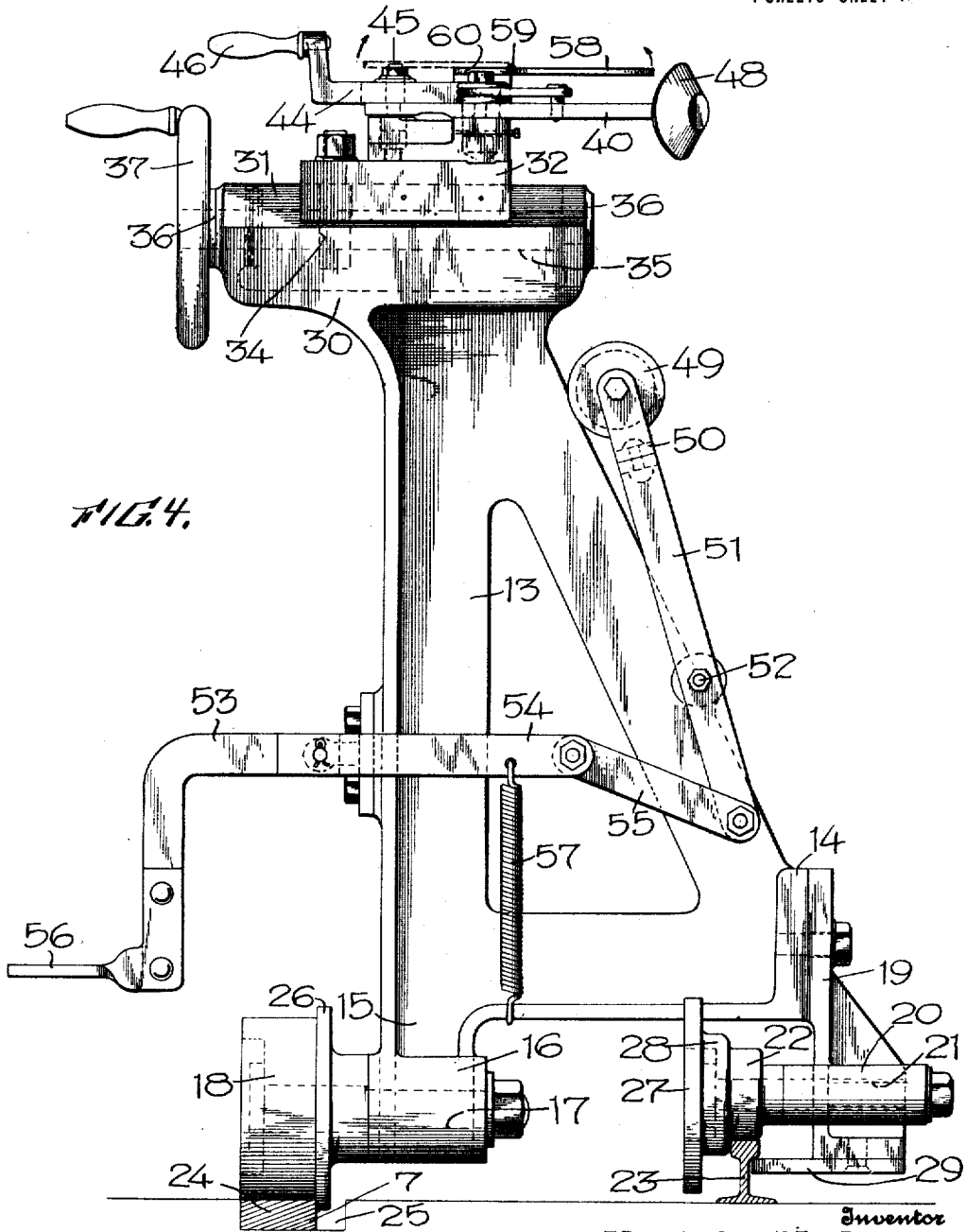

KARL B. KILBORN, OF AKRON, OHIO, ASSIGNOR TO THE GOODYEAR TIRE & RUBBER COMPANY, OF AKRON, OHIO, A CORPORATION OF OHIO.

TREADING-MACHINE.

1,309,894.  Specification of Letters Patent.  Patented July 15, 1919.

Application filed November 13, 1916. Serial No. 131,048.

*To all whom it may concern:*

Be it known that I, KARL B. KILBORN, a citizen of the United States, residing at Akron, in the county of Summit and State of Ohio, have invented new and useful Improvements in Treading-Machines, of which the following is a specification.

My present invention relates to a system for treading tire carcasses and in particular contemplates the arrangement of a number of carcass-mounting units in a series, and the provision of a treading machine mounted for intermittent correlation with each of the carcass-supporting units of the series.

In the best modern practice of vehicle tire manufacture, the carcasses are usually built up upon a machine which carries a revoluble core toward which a stitcher head may be approached, the head carrying stitcher wheels which serve to press the edges of the fabric plies composing the carcass firmly into conformity with the core. The carcass building operation is one that is continued uninterruptedly until the desired number of plies has been laid up upon the core, and, after a partial vulcanization in many cases, the carcass is in readiness to be equipped with its sidewall-stock, coverstock and tread.

The operation of treading a tire, however, is not necessarily a continuous process, although this has been the method which the present practice has followed and which the system comprehended by this invention aims to improve. A stitching machine is employed for some of the treading operations, but it must necessarily remain idle for a large majority of the time, if an individual stitcher machine is employed for each carcass to be treaded. This is true owing to the large proportion of handwork which the treading of a tire requires, the side-wall, cushion and cover stock demanding the niceties of manual application.

With these conditions in mind, I have evolved the present system, which is based upon the utilization of a portable treading machine in connection with a series of alined cores upon which are placed the tires to be finished by the treading operation.

As a principal object, I contemplate the provision of a trackway adapted to pass along the row of revolubly mounted cores, and the provision of a novel and improved treading machine which is fitted in such a manner that it may be rolled upon the trackway for movement into a position of operation before any of the cores of the alined series.

In this manner a crew of workmen, each of which has his particular portion of the work to do, may pass along the row of cores in succession, each of the crew in his turn contributing toward the finishing of each of the tire carcasses. One of the members of this crew has charge of the portable stitcher which forms the main element of my system, and thus the work of treading a number of tires is not only expedited by the allotment of special portions of the work to various members of the crew, but a great expense in machinery is saved over any arrangement which contemplates the use of a fixed treading machine for each of the cores.

The above and additional objects of a similar nature, which will be hereinafter more specifically treated, are preferably accomplished by such means as are illustrated in the accompanying drawings, described in the following specification, and then more particularly pointed out in the claims which are appended hereto and form a part of this application.

With reference to the drawings, wherein there has been illustrated a preferred embodiment of the invention as it is reduced to practice, and throughout the several views of which, similar reference numbers designate corresponding parts:

Fig. 4 is a rear elevational view of the portable stitching machine.

The system provided herein aims at the provision of means whereby the finishing processes of tire construction may be accomplished in successive steps by a group of workmen, each of whom is intrusted with a certain detail addition to the finishing of each tire.

The first workman may distribute the treads to successive carcasses which are to be roughly applied by the second; leaving to the third workman the stitching down of the tread upon the carcass. Or the system may be sufficiently comprehensive to include the application of the side-wall, cushion and cover stocks to the green carcasses. Regardless of the number of laborers employed, or the scope of their duties, however, the present system contemplates the use of a portable machine to be operated by one of the following workmen for stitching the prepared treads down upon their carcasses, this laborer moving from one carcass to another of the series and moving the machine in turn as he progresses down the line.

Figure 1:
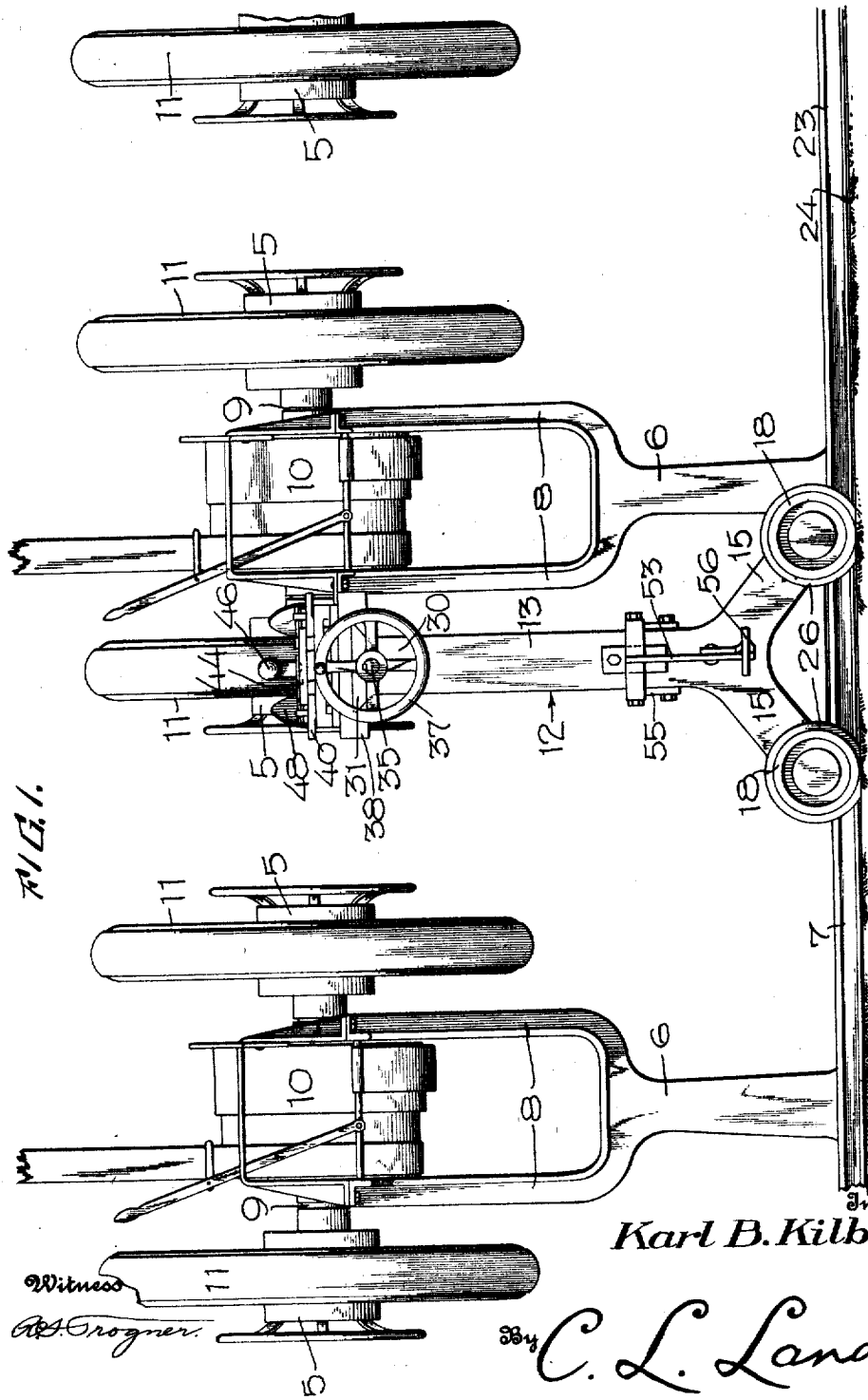
Figure 1 is a view in front elevation of a portion of the tire or carcass-mounting unit series comprehended in this present system.
Figure 2:
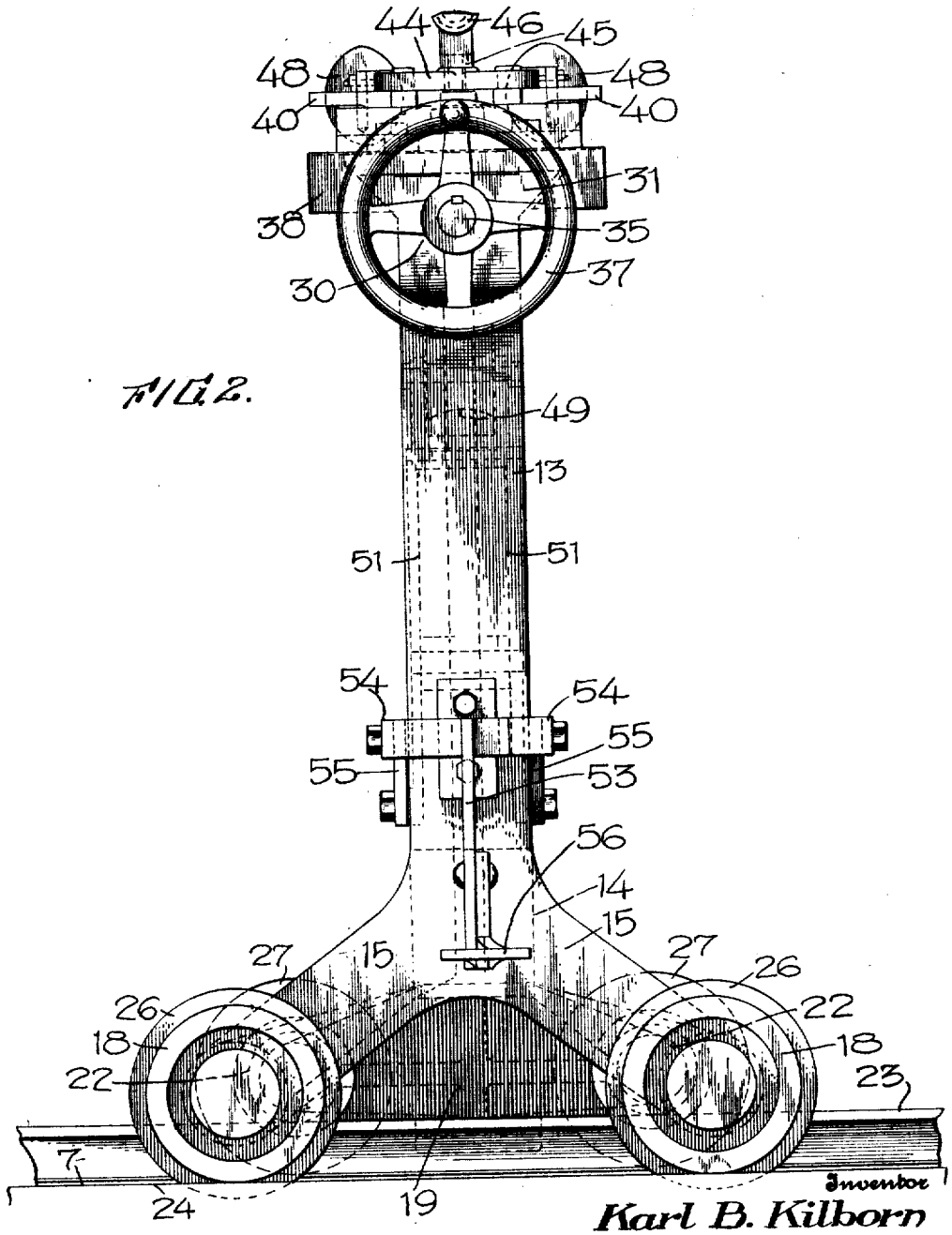
Fig. 2 is a rear elevational view of the stitcher machine *per se;*
Figure 3:
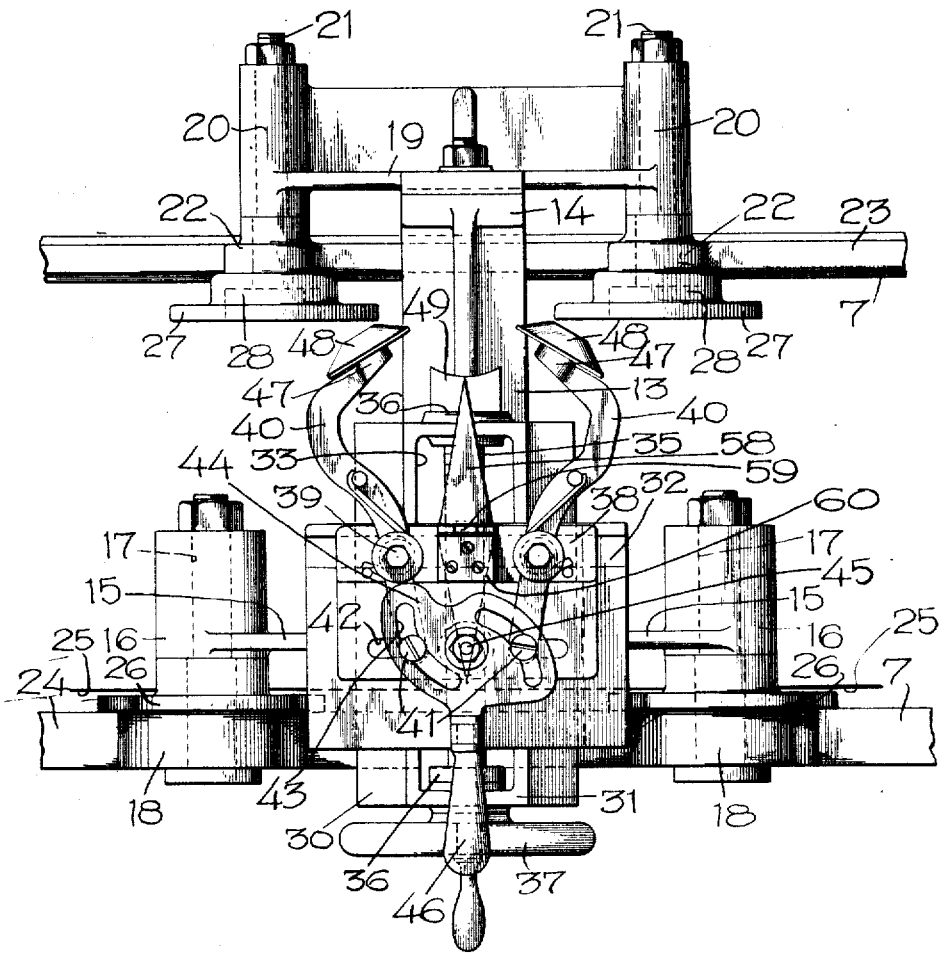
Fig. 3 is a plan view of the machine.

In Fig. 1 there has been illustrated a plurality of revoluble chucks 5, which are mounted in pairs upon standards 6, the latter being alined as units of a series adjacent to which is arranged a trackway 7. Each of the standards 6 has a pair of bifurcated arms 8 which support between them a shaft 9 having drive pulleys 10 arranged thereon. At opposite extremities of the shaft 9 are arranged a pair of the chucks 5, each of which may carry a carcass or tire 11. The stands 6 are alined in rows of any number and each row is fed by the trackway 7, in order that a portable stitching machine 12 may be moved along each row of stands for operation upon successive carcasses 11.

The stitching machine which is utilized in my present system for treading tires, includes the A-frame 13, which terminates at its forward lower edge in the flattened abutment 14, and which is provided with a bifurcate pair of rearwardly extending legs 15. These latter terminate in the alined bearings 16 in which are mounted the shafts 17 of wheels 18, while the abutment 14 serves as a point of securement for a substantially rectangular plate 19, the extremities of which terminate in bearings 20 for the accommodation of the shafts 21 of the wheels 22.

The frame 13 is thus made portable along the trackway 7 provided for the front wheels 22 and the rear wheels 18. This trackway consists of a forward rail 23 and a rear rail 24, the latter being sunk flush with the surface of the floor.

The rear rail thus provides no obstruction to the travel of employees nor to the passage of trucks through those portions of a factory in which my system is installed. A groove 25 is arranged to accommodate the rail 24 in the flooring, such groove also permitting the use of a flange 26 upon the rear wheels of the machine. Flanges 27 are provided upon the front wheels also, and are of such size that the machine may be rolled off its trackway upon the floor without being tilted to a dangerous degree. Secondary flanges 28 maintain the fore wheels 22 upon their rail 23, while underslung guides 29 are placed upon the plate 19 to contact with the web of the rail 23, and maintain balance of the machine, should the latter tend to be pressed backward by the motion of the rotating carcasses upon which it is engaged in operating.

Supported by the frame 13 and at the apex of the A thereof is the stitcher base 30, which is formed with a central dove-tailed rib 31 upon which is slidable a similarly grooved stitcher carriage 32. The rib 31 of the stitcher base is provided with a longitudinal slot 33 through which there is adapted to project the threaded collar 34, the latter being mounted upon the traveling screw 35, which is arranged for rotation in terminal bearings 36. The shaft of the screw is provided with a hand wheel 37 whereby the stitcher carriage 32 may be advanced or retracted along the mounting rib of the carriage base.

Across the front of the stitcher carriage 32 there is erected a bar 38 which is transfixed by bolts 39 serving to pivotally mount the stitcher arms 40. The rear ends of these arms are transfixed by pins 41 which are operable within slots 42, these being drawn from the respective pivot points 39 as a center. The pins 41 are also operable within cam slots 43 of a control member 44, this latter being centrally mounted by a pivot 45 in such a manner that oppositely directed cam slots 43 engage the terminal pins of the stitcher arms to control the simultaneous converging or diverging of the opposite extremities of the arms, in accordance with the direction of rotation of the control member. The member 44 is provided with an operating handle 46 whereby the workmen may control movement of both stitcher arms at once.

At their outer extremities, the arms 40 are provided with bearing portions 47 in which are journaled stitcher wheels 48. The type of stitcher wheel employed is not a matter of particular interest to this invention, as these wheels or disks may partake of the conical shape illustrated, or of any other shape known to the art. Springs may be provided in the usual manner to normally maintain the stitcher arms in a separated position.

In addition to the stitching mechanism described my portable tire treading machine also carries a smoothing roller 49, which is formed with a concave periphery of such size and shape as to adapt the wheel to fit the convex contour of the tire to be treaded. This wheel is mounted by a bracket 50 at the extremity of a pair of combined lever arms 51, the latter being pivoted to the forward portion of the A-frame 13 at the point 52. A bifurcated control lever 53 is projected to the rear of the machine and has arms 54 extending forward on each side of the frame 13 for connection by means of respective links 55 to the lower terminals of the arms 51. The bifurcate lever 53 carries a foot pedal 56, a downward pressure upon which will obviously cause a rotation of the lever arms 51 about their common pivot point 52 in a clockwise direction (Fig. 1) which will move the roller 49 forward into contact with the tire periphery. Springs 57 are secured at their lower extremities to the frame 13, and at their upper extremities to the legs 53 of the bifurcate control lever, these springs being of the contractile coil type and serving to withdraw the smoothing roller 49 from contact with the tire, in the absence of any downward pressure upon the foot pedal 56.

It is a characteristic of the present machine, that it should be substantially centered upon the tire if the stitching operation is to prove efficient in placing the tread upon the tire. Fixed stitchers are centered with respect to their conjunctive tires at the time of construction, but some other means of centering must be employed for a machine movable relative to its tires. To this end, I employ the centering device which comprises a pointer member 58, this member being hinged at 59 to a plate 60 arranged upon the longitudinal axis of the stitcher top. The operator has but to mark the center of a tire carcass and then arrange the machine with the pointer 58 in alinement with the mark on the tire, in order to be certain that the machine is centered on the tires. When not in use, the pointer 58 may be turned back into the position indicated by the dotted lines. Not only may the machine be thus centered on the carcass, but the loose tread may also be placed with exactitude by a judicious use of the pointer.

The foregoing completes the description of the portable tire treading machine around which the system I propose herein has been arranged. The trackway 7 is laid along a row of the revoluble tires which are to be treaded, and the treading machine is mounted upon its trackway, upon which it may readily be pushed into a centered position before any of the tires, its weight serving to maintain it stationary during the stitching of any of the tire treads. The workman operating the machine moves the latter from tire to tire, following the group of hand-workers who apply the cover and tread strips to the carcass.

By employment of this system I gain all the advantages of uniform machine work in the tread stitching operations, while at the same time I save what would otherwise be a relatively great outlay for individual machines to obtain this end. I also secure that expedition of the work which obtains where a crew of men are each intrusted with one step of a process in contradistinction to any method which requires each of the men to be equally proficient in all of the steps which make up the processes.

What I claim is:

1. An apparatus for treading tires including a track-way, a plurality of revoluble tire holders arranged in proximity to said trackway, a frame mounted for movement upon the track-way, a stitcher head carried by the frame and stitchers mounted upon said stitcher head for a variable and successive engagement with the periphery of the tires mounted upon the said tire holders.

2. An apparatus for treading tires including a track-way, a plurality of revoluble tire holders arranged in proximity to said track-way, a frame mounted for movement upon the track-way, a stitcher head carried by the frame, stitchers mounted upon said stitcher head for a variable and successive engagement with the periphery of the tires mounted on the said tire holders and a roller pivoted upon said frame and adapted to be moved into engagement with each of said tires.

3. An apparatus for treading tires including a track-way, a plurality of revoluble tire holders arranged in proximity to said track-way, a frame, wheels carried by the frame to mount the latter for movement along said track-way, a stitcher head carried by said frame, stitching means arranged upon said head, and means for controlling movement of said stitcher means along said head whereby the stitcher means may be successively engaged with each of said tire holders for applying a tread thereto.

In testimony whereof I have signed my name in the presence of two subscribing witnesses.

KARL B. KILBORN.

Witnesses:
L. E. WAGNER,
H. J. GINTHER.

Copies of this patent may be obtained for five cents each, by addressing the "Commissioner of Patents, Washington, D. C."